(12) United States Patent
Landais et al.

(10) Patent No.: US 10,645,611 B2
(45) Date of Patent: May 5, 2020

(54) OVERLOAD CONTROL FOR TRUSTED WLAN ACCESS TO EPC

(71) Applicant: Alcatel Lucent, Boulogne-Billancourt (FR)

(72) Inventors: Bruno Landais, Lannion (FR); Laurent Thiebaut, Nozay (FR); Nicolas Drevon, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/105,856

(22) PCT Filed: Dec. 18, 2014

(86) PCT No.: PCT/EP2014/078605
§ 371 (c)(1),
(2) Date: Jun. 17, 2016

(87) PCT Pub. No.: WO2015/091878
PCT Pub. Date: Jun. 25, 2015

(65) Prior Publication Data
US 2016/0323774 A1    Nov. 3, 2016

(30) Foreign Application Priority Data
Dec. 19, 2013  (EP) .................................... 13290320

(51) Int. Cl.
*H04W 28/02* (2009.01)
*H04W 12/06* (2009.01)
(Continued)

(52) U.S. Cl.
CPC ......... *H04W 28/0284* (2013.01); *H04L 47/12* (2013.01); *H04W 12/06* (2013.01);
(Continued)

(58) Field of Classification Search
CPC ......... H04W 28/0284; H04W 72/0486; H04W 76/068; H04W 74/085; H04W 12/06;
(Continued)

(56) References Cited

U.S. PATENT DOCUMENTS

| 2007/0253385 A1* | 11/2007 | Li | ........................ | H04W 16/06 370/388 |
| 2014/0153546 A1* | 6/2014 | Kim | ...................... | H04W 48/18 370/332 |
| 2014/0293780 A1* | 10/2014 | Faccin | .................. | H04W 28/02 370/230 |

FOREIGN PATENT DOCUMENTS

| CN | 102223634 A | 10/2011 |
| CN | 102595508 A | 7/2012 |

(Continued)

OTHER PUBLICATIONS

3GPP, SA WG2 Meeting#99, Sep. 23-27, 2013, Xiamen, China, revision of S2-133693 (Year: 2013).*
(Continued)

*Primary Examiner* — Mohammad S Anwar
(74) *Attorney, Agent, or Firm* — Harness, Dickey & Pierce, P.L.C.

(57) ABSTRACT

In an embodiment, a method is provided for overload control for Trusted WLAN access to EPC, comprising:
  when rejecting a request for an UE in single connection mode (SCM) for an authenticated and authorized user, the network signalling a back-off time to the UE for the requested APN when congestion control is active for the APN,
  upon reception of the back-off time, the UE not initiating new request for the congested APN, for the duration of the back-off time.

6 Claims, 3 Drawing Sheets

Figure 1:
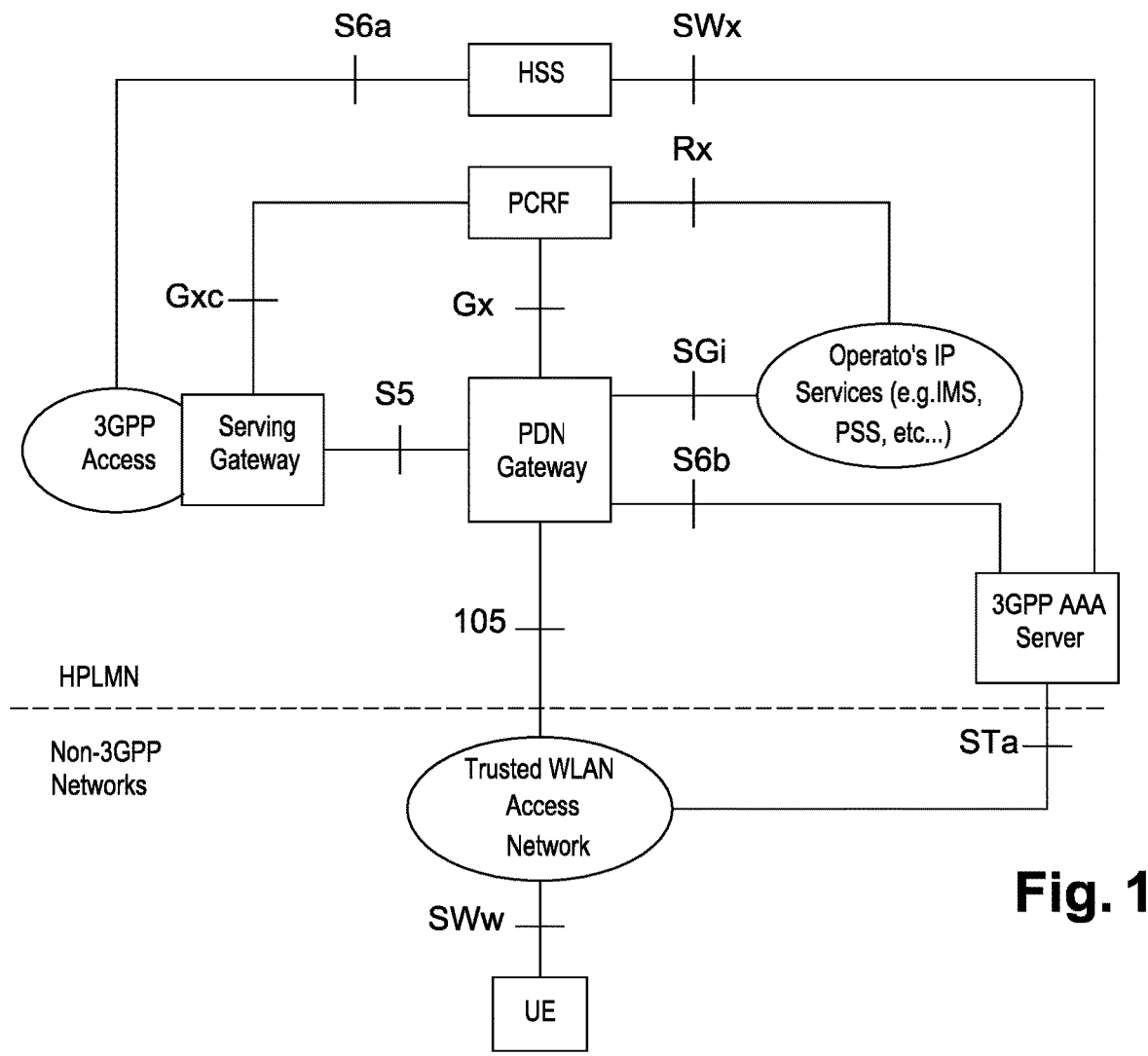

(51) Int. Cl.
| | |
|---|---|
| *H04W 74/08* | (2009.01) |
| *H04L 12/801* | (2013.01) |
| *H04W 76/18* | (2018.01) |
| *H04W 72/04* | (2009.01) |
| *H04W 84/12* | (2009.01) |
| *H04W 76/12* | (2018.01) |

(52) U.S. Cl.
CPC ..... *H04W 72/0486* (2013.01); *H04W 74/085* (2013.01); *H04W 76/18* (2018.02); *H04W 76/12* (2018.02); *H04W 84/12* (2013.01)

(58) Field of Classification Search
CPC . H04W 76/027; H04W 76/022; H04W 84/12; H04L 47/12
See application file for complete search history.

(56) References Cited

FOREIGN PATENT DOCUMENTS

| | | |
|---|---|---|
| CN | 103748926 A | 4/2014 |
| WO | WO-2013/004905 A1 | 1/2013 |

OTHER PUBLICATIONS

"3rd Generation Partnership Project; Technical Specification Group Service and System Aspects; Architecture enhancements for non-3GPP accesses (Release 12)" 3GPP TS 23.402 V12.3.0, Dec. 13, 2013.

"3rd Generation Partnership Project; Technical Specification Group Service and System Aspects; General Packet Radio Service (GPRS) enhancements for Evolved Universal Terrestrial Radio Access Network (E-UTRAN) access (Release 12)", 3GPP TS 23.401 V12.3.0, Dec. 13, 2013.

"3rd Generation Partnership Project; Technical Specification Group Service and System Aspects; Study on Core Network Overload (CNO) solutions (Release 12)" 3GPP TS 23.843-120_including editorial updetes_clean, Oct. 16, 2013.

Chinese Office Action dated May 21, 2019 issued in Chinese Application No. 201480075824.3.

Chinese Office Action dated Sep. 5, 2019 issued in Chinese Application No. 201480075824.3.

\* cited by examiner

OVERLOAD CONTROL FOR TRUSTED WLAN ACCESS TO EPC

CROSS-REFERENCE TO RELATED APPLICATIONS

This application is a national phase under 35 U.S.C. § 371 of PCT International Application No. PCT/EP2014/078605 which has an International filing date of Dec. 18, 2014, which claims priority to European Application No. EP 13290320.4, filed Dec. 19, 2013, the entire contents of each of which are hereby incorporated by reference.

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

In general, in a packet mobile communication system, an User Equipment (UE) has access to a mobile network providing Packet Data Network (PDN) connectivity services (typically IP connectivity services). A mobile network generally comprises a Core Network (CN) accessed by an Access Network (AN), The CN generally comprises, amongst others, a PDN Gateway (PDN-GW) interfacing with an external PDN (typically an IP network, such as Internet. Intranet, or Operator's IP network e.g. IMS network) represented by an Access Point Name (APN). A PDN/IP connection established between an UE and a PDN/IP network over a mobile network can be used to have access to various IP-based user services or applications.

An example of packet mobile communication system is Evolved Packet System (EPS). An EPS network comprises a CN (called Evolved Packet Core (EPC)), which can be accessed by a 3GPP Access Network (3GPP AN) such as for example E-UTRAN, as well as by a Non-3GPP Access Network (non-3GPP AN) such as for example WLAN.

Figure 2:
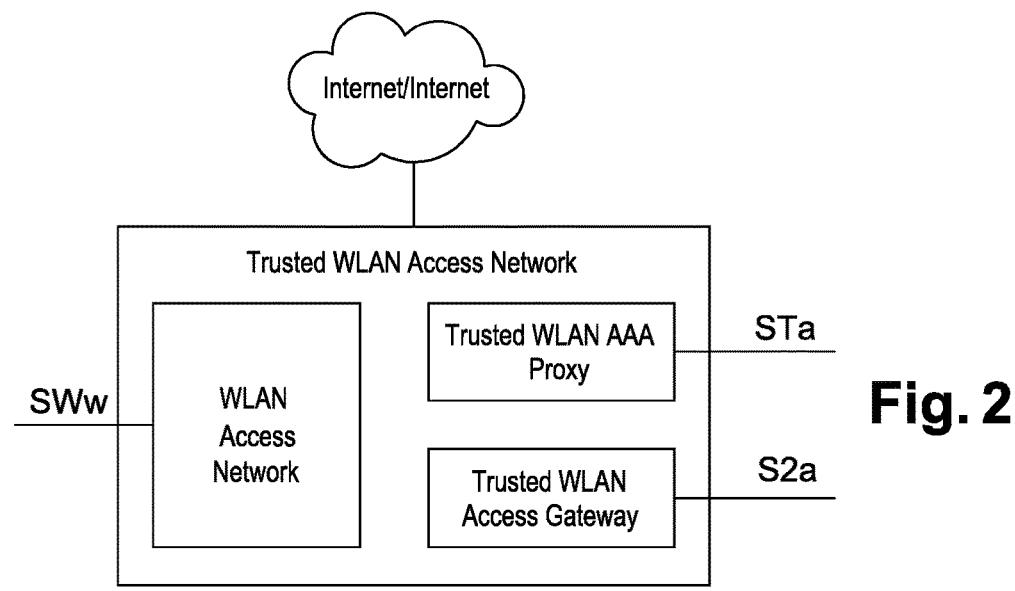

Non-3GPP access to EPC is specified in particular in 3GPP TS 23.402. An example of architecture for Trusted WLAN access to EPC is illustrated in FIG. 1 taken from 3GPP TS 23.402. A Trusted WLAN Access Network (TWAN) interfaces with a PDN Gateway (also called PGW in EPC) via an interface called S2a interface which can be based on GTP (GPRS Tunnelling Protocol) or on PMIP (Proxy Mobile IP). A Trusted WLAN Access Network (TWAN) also interfaces with a 3GPP AAA Server via an interface called STa interface. An example of functional split within a Trusted WLAN Access Network (TWAN) is illustrated in FIG. 2 taken from 3GPP TS 23.402, TWAN includes, in particular, a WLAN Access Network which interfaces with the UE, a Trusted WLAN Access Gateway (TWAG) which terminates the S2a interface, and a Trusted WLAN AAA Proxy (TWAP) which terminates the STa interface.

An important issue in such systems is that performances may be degraded in overload situations, due in particular to high signalling load, in particular in Core Network entities. In addition, specific issues arise, in particular for Trusted WLAN Access to EPC and for Transparent Single Connection Mode (TSCM) or Single Connection Mode (SCM) (for which no WLAN Control Protocol (WLCP) is supported), as there is currently no well-defined UE behaviour for handling network overload in such cases. There is a need to solve such issues, more generally there is a need to avoid degradation of performances of such systems in overload situations.

Embodiments of the present invention in particular address such needs.

These and other objects are achieved, in one aspect, by a Trusted WLAN Access Network TWAN, for trusted WLAN access to EPC, configured to:
  when, for an authenticated and authorized user, rejecting, due to congestion, a request for an UE in single connection mode (SCM) signal to a AAA Server a congestion cause and a back-off time for an UE.

These and other objects are achieved, in another aspect, by a AAA Server, configured to, for trusted WLAN access to EPC:
  receive from a Trusted WLAN Access Network TWAN a congestion cause and a back-off time for a request for an UE in single connection mode,
  include a congestion cause and the back-off time in a response message it sends to the UE
  optionally reject any subsequent request from the same UE until the back-off timer expires, by returning a response message with a congestion cause and with the remaining back-off time.

These and other objects are achieved, in another aspect, by a AAA Server, configured to, for trusted WLAN access to EPC:
  receive from a Trusted WLAN Access Network TWAN an APN congestion cause and a back-off time for a requested APN for a request for an UE in single connection mode,
  include an APN congestion cause and the back-off time in a response message it sends to the UE
  optionally reject any subsequent request from the same UE targeting the same APN until the back-off timer expires, by returning a response message with a congestion cause and with the remaining back-off time.

These and other objects are achieved, in another aspect, by an User Equipment UE, configured to, at trusted WLAN access to EPC:
  upon reception from a AAA Server, of a congestion cause and back-off time, not initiate any new request for the duration of the back-off time.

These and other objects are achieved, in another aspect, by a Trusted WLAN Access Network TWAN, for trusted WLAN access to EPC, configured to:
  when rejecting, due to congestion, a request for an UE in SCM mode for an authenticated and authorized user, start a back-off timer for the UE, or for the UE and the requested APN when congestion control is active for the requested APN:
  reject any subsequent request from the same UE or any subsequent request from the same UE targeting the APN until the back-off timer expires, by returning a response message to the AAA Server with a congestion cause and with the remaining back-off time.

These and other objects are achieved, in another aspect, by a Trusted WLAN Access Network TWAN, for trusted WLAN access to EPC, configured to:
  when, due to congestion, rejecting a request for an UE in TSCM mode for an authenticated and authorized user, start a back-off timer per UE when congestion control is global or start a back-off timer per UE and per SSD when congestion control is active for the requested APN.

These and other objects are achieved, in another aspect, by a method for overload control for Trusted WLAN access to EPC, comprising:
  when rejecting, due to congestion, a request for an UE in SCM mode for an authenticated and authorized user, the network signalling a back-off time to the UE, possibly only applicable to the requested APN when congestion control is active for the APN, upon reception of the back-off time, the UE not initiating new request or new request for the congested APN, for the duration of the back-off time.

These and other objects are achieved, in another aspect, by a method for overload control for Trusted WLAN access to EPC, comprising:

when rejecting, due to congestion, a request for an UE in TSCM mode for an authenticated and authorized user, the Trusted WAN Access Network TWAN starling a back-off timer per UE when congestion control is global or starting a back-off timer per UE and SSID when congestion control is active for the requested APN.

Figure 3:
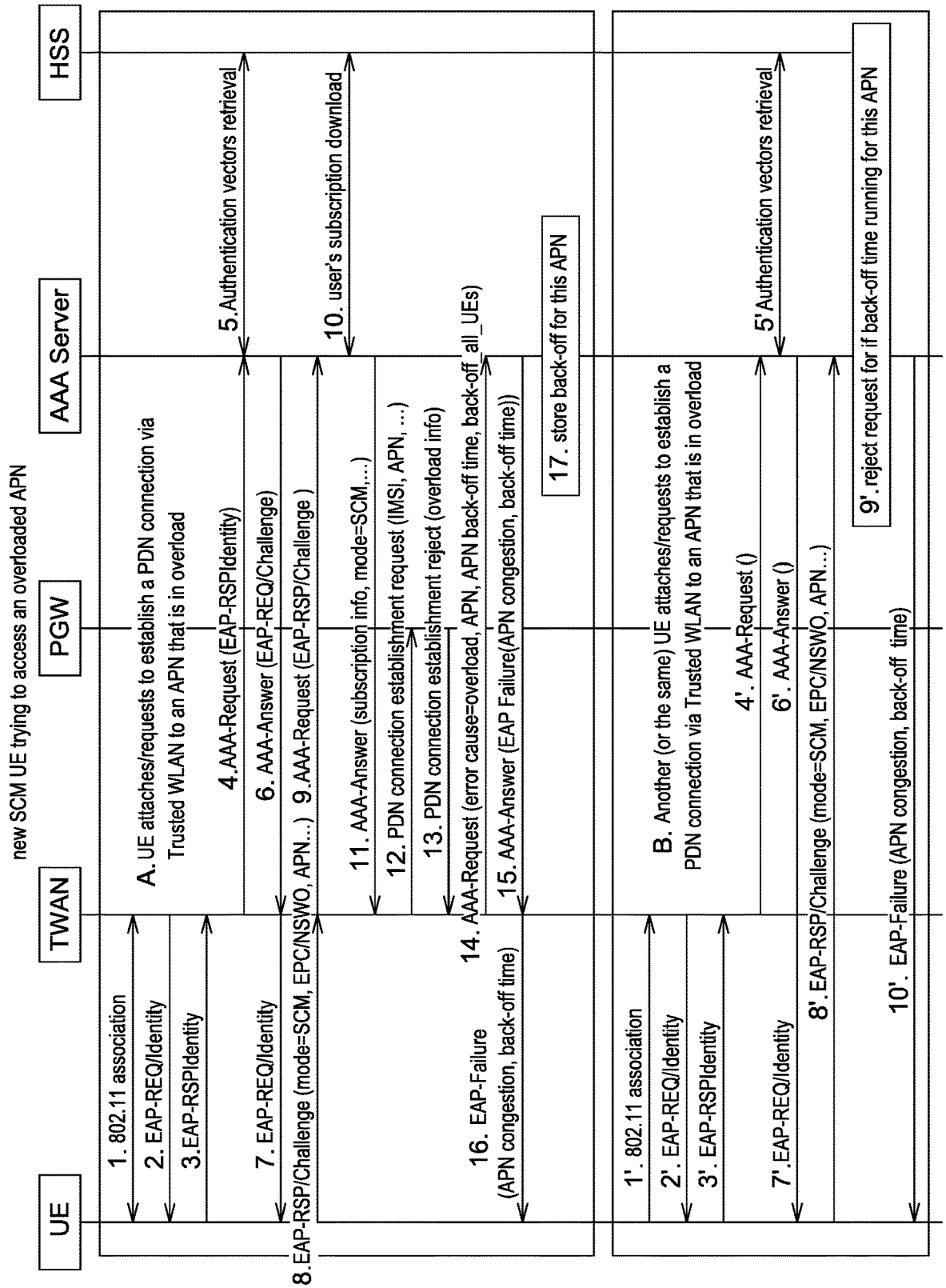
Figure 4:
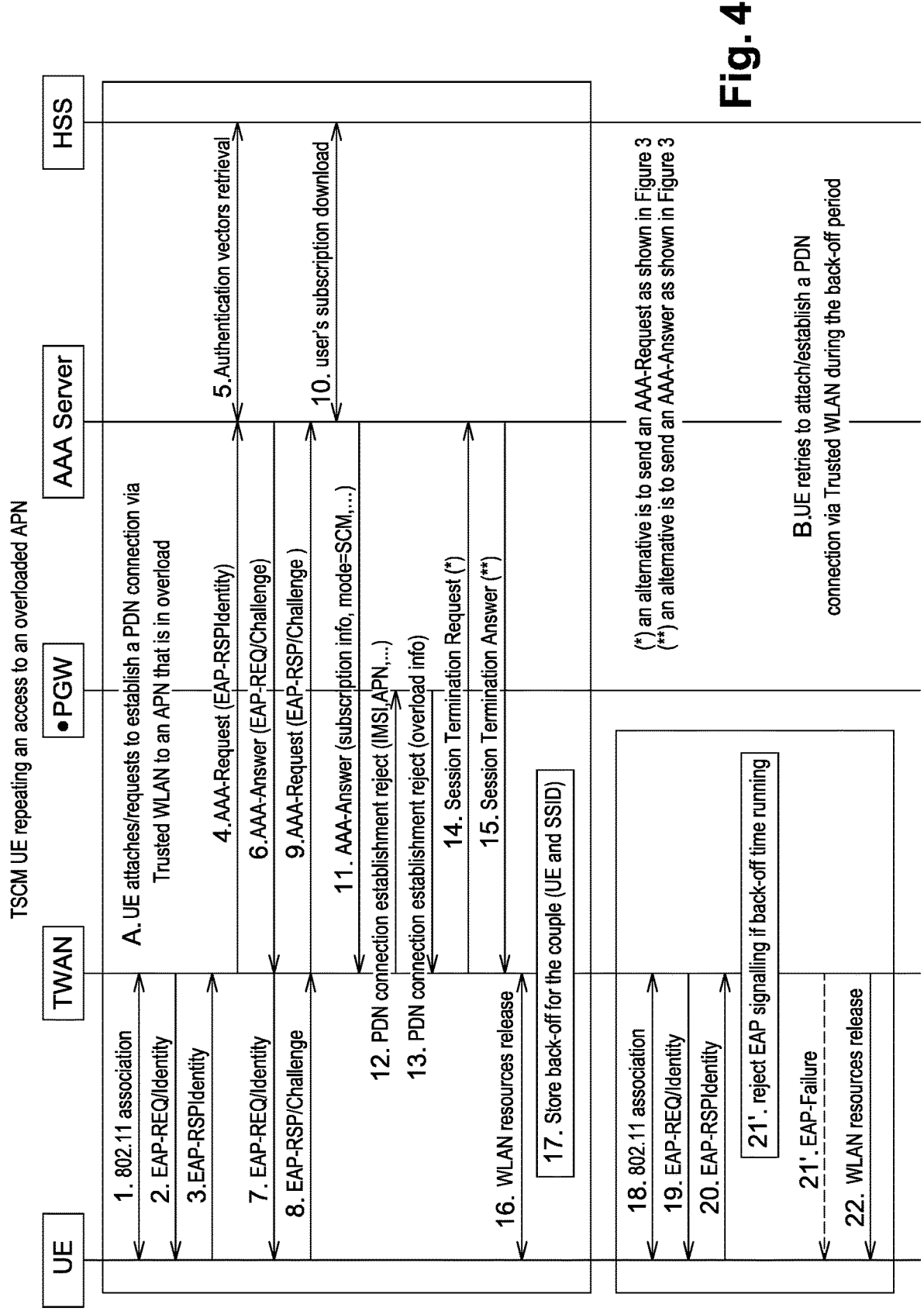

Some embodiments of apparatus and/or methods in accordance with embodiments of the present invention are now described, by way of examples only, and with reference to the accompanying drawings, in which:

FIG. 1 is intended to recall an example of architecture for Trusted WLAN Access to EPC, FIG. 2 is intended to recall an example of Trusted WLAN functional split, FIG. 3 is intended to illustrate an example of APN back-off mechanism for UEs in Single-Connection Mode, according to embodiments of the present invention, FIG. 4 is intended to illustrate an example of APN back-off mechanism for UEs in Transparent Single-Connection Mode, according to embodiments of the present invention.

Various embodiments and/or aspects of the present invention will be more detailed in the following, to simplify based on examples. However embodiments and/or aspects of the present invention are not limited to these examples. For example:

Embodiments and/or aspects of the invention are not limited to APN congestion, in particular APN congestion and/or PGW overload could more generally be considered, Embodiments and/or aspects of the invention are not limited to the use of certain signaling protocols such as for example EAP, but other ways could be used, as understood by the skilled person, . . . etc.

3GPP has been working extensively on Core Network Overload solutions in 3GPP Release 12 to prevent network outages due to overload (see 3GPP TR 23.843). This results in the specification of new load and overload control mechanisms over Diameter and GTP-C based interfaces.

3GPP CT4 is currently defining the new GTP-C overload control procedures in 3GPP TR 29.807. Frequent RAT-reselection due to scattered non-3GPP (e.g. WiFi) coverage or massive mobility between 3GPP and non 3GPP coverage may in particular result in GTP-C overload due to frequent or massive inter-system change activities i.e. UEs trying to either create PDN connections over the new access or moving PDN connections between 3GPP and non 3GPP coverage (see clause 4.1 of TR 29.807). CT4 has thus concluded that support of GTP-C overload control is desirable on the S2a (trusted non-3GPP access network-PGW) and S2b (untrusted non-3GPP access network-PGW) interfaces to reduce the signaling traffic the TWAN or ePDG send to the PGW according to the PGW's available capacity (see clause 4.2.4.3.3.1 of TR 29.807). This is even more useful as overload control is also introduced over the S5/S8 interfaces for 3GPP access, and thus a PGW should be able to equally shed traffic in excess from requests received via 3GPP and non-3GPP accesses when experiencing overload at PGW level or at APN level.

The network needs to reject the UE request to establish or handover a PDN connection when it cannot process this request successfully (e.g., due to an overload at the PGW or a congestion of the resources (e.g. IP address pool) associated to the APN requested by the UE), regardless of whether overload control is supported or not on the S2a or S2b interfaces.

However, for UEs accessing EPC via the trusted WLAN access using the Transparent Single-Connection Mode (TSCM) (*), the network has no means to indicate to the UE why it rejects the UE request nor can it instruct the UE from not trying again to access EPC via the trusted WLAN access for some period of time. As a result, the UE may repeat (immediately or shortly afterwards) the whole procedure to get EPC access via trusted WLAN access, including the authentication and authorization procedures towards the 3GPP AAA Server and HSS. This causes extra and undesired signalling towards the TWAN, 3GPP AAA Server and the HSS (i.e., 3GPP AAA Server retrieving UE's authentication vectors from the HSS, EAP authentication exchange between the AAA Server and the UE, download of subscription information from the HSS to the AAA Server, AAA Server downloading all subscription information to the TWAN), for a UE request that will need to be rejected again if the reason for rejecting the former request is still applicable (e.g. PGW still in overload).

For UEs accessing to EPC via the trusted WLAN access using the Single-Connection Mode (SCM) (**), the 3GPP AAA Server can return a failure cause to the UE via new EAP extensions. However no mechanism has been defined here to refrain a UE from accessing again the network via the trusted WLAN access for some period of time, which entails the same risks of causing extra signaling load to the TWAN, 3GPP AAA Server and HSS.

So mechanisms are required to protect the 3GPP AAA Server, HSS and TWAN from UE attempts to access an overloaded APN or PGW and to ensure that the new GTP-C overload control on S2a does not increase the signaling load towards the 3GPP AAA Server and HSS.

Note 1: an editors note in clause 4.2.4.3.3.3 of TR 29.807 indicate that how to address these issues is For Further Study.

Note 2: for UE accessing to EPC via trusted WLAN access using the Multi-Connection Mode (MCM (***), TR 29.807 (see clause 4.2.4.3.3.3) proposes to specify a new APN back-off mechanism in the WLCP protocol (WLAN Control Protocol) between the TWAN and the UE in order to prevent UE retries.

(*) TSCM=the only communication mode specified for trusted WLAN access in Rel-11 (SaMOG), mandatory for UE, that is capable to support only a single connection at a time between a UE and a trusted WLAN, and where the associated parameters of the connection are derived from the user's subscription and the WLAN SSID selected by the UE.

(**) SCM=new communication mode added in eSaMOG Rel-12, optional for UE, that is capable to support only a single connection at a time between a UE and a trusted WLAN, and where the associated parameters of the connection (e.g. for NSWO, for PDN connectivity, APN, etc.) can be negotiated during authentication over TWAN.

(***) MCM=new communication mode added in eSa-MOG Rel-12, optional for UE, that is capable to support a single or multiple connections at a time between a UE and a trusted WLAN.

Embodiments of this invention include two complementary mechanisms to protect the 3GPP AAA Server, HSS and TWAN from repeated UE attempts to access an overloaded APN or PGW. Embodiments for these two mechanisms will be considered respectively in paragraphs 1) and 2) below.

1) The TWAN and 3GPP AAA Serve Implements a New Back-Off Mechanisms for UEs in SCM, as Follows:

When rejecting a UE request (new PDN connection or handover request in trusted WLAN access) from an authenticated and authorized user, the network may signal a back-off time to the UE for the requested APN when congestion control is active for an APN (e.g. PGW has triggered overload control towards the TWAN for traffic targeting this APN). The TWAN communicates the APN back-off time to the 3GPP AAA Server for that APN, and the 3GPP AAA Server includes this back-off time in the EAP Failure message it sends to the UE.

Such mechanism enhances the EAP protocol with extensions for the single-connection mode:

when rejecting the UE request, the TWAN returns a new APN congestion cause and the APN back-off timer to the 3GPP AAA Server, that the 3GPP AAA Server propagates to the UE via EAP extensions.

Upon reception of that back-off time, the UE shall not initiate any new PDN connection requests for the congested APN (be it via 3GPP or non-3GPP access) for the duration of this back-off time. The UE may initiate new requests for other APNs.

Additionally, the 3GPP AAA Server may immediately reject any subsequent request from the same UE targeting this APN until the back-off timer is expired, e.g. for the case where the new APN back-off mechanism (above) was decided in 3GPP standards to be optional for a UE to support, or e.g. to protect the network from a misbehaving or "cheating" UE. In that case, the 3GPP AAA Server does not download the user's subscription information from the HSS and does not authorize the TWAN to proceed with the UE request.

Besides, if the TWAN also indicated to the 3GPP AAA Server that any other UEs's requests (in SCM or TSCM) targeting this APN should also be throttled until the back-off timer is expired, the 3GPP AAA Server may immediately reject any subsequent request from any UEs targeting this APN until the back-off timer is expired.

2) The TWAN Implements a Back-Off Mechanism on Behalf of UEs, for UEs in TSCM, as Follows:

When rejecting a UE request (new PDN connection or handover request in trusted WLAN access) from an authenticated and authorized user, the TWAN may start a back-off timer per UE (and possibly per SSID) when congestion control is active for an APN (e.g. PGW has triggered overload control towards the TWAN for traffic targeting this APN).

Note 1: On a given SSID, a TSCM UE can only access one pre-defined APN, thus if an UE attempt has been rejected on this SSID due to congestion, any further UE connectivity attempt may be rejected during the back-off time.

The UE may nevertheless be allowed to access on another SSID where the UE may be granted access to Non-Seamless WLAN offload or another APN.

The TWAN may immediately reject any subsequent request from the UE targeting this APN, i.e. any subsequent EAP signalling originated from the same UE's MAC address over the same selected WLAN SSID, before the back-off timer is expired. The TWAN does not generate any AAA signalling towards the 3GPP AAA Server in that case.

Note 2: a UE in TSCM cannot signal to the network whether it requests an EPC access or Non-Seamless WLAN offload (NSWO), nor the associated parameters for an EPC access (e.g. requested APN). The type of access (EPC or NSWO) is derived from the WLAN SSID selected by the UE (there is a one to one mapping between an SSID and a type of access), and the associated parameters for an EPC access are derived from the users subscription (default APN configuration).

Note 3: this mechanism may also work for the case of a misbehaving/cheating SCM UE that does not comply to the back-off time received from the network or if the new APN back-off mechanism in SCM was decided in 3GPP standards to be optional for a UE to support.

Embodiments of the invention include two complementary mechanisms to protect the 3GPP AAA Server, HSS and TWAN from repeated UE attempts to access an overloaded APN or PGW. More detailed embodiments for these mechanisms will be considered respectively in paragraphs 1) and 2) below.

1) The TWAN and 3GPP AAA Server Implements a New Back-Off Mechanism for UEs in SCM, as Follows:

Embodiments of such mechanism are illustrated in FIG. 3 (new SCM UE trying to access an overloaded APN).

When rejecting a UE request (new PDN connection or handover request in trusted WLAN access) from an authenticated and authorized user, the network may signal a back-off time to the UE for the requested APN when congestion control is active for an APN (e.g., PGW has triggered overload control towards the TWAN for traffic targeting this APN).

So at step 11 or 13, depending on whether the TWAN already knows whether the APN or PGW is overloaded, the TWAN communicates the APN back-off time to signal to the UE to the 3GPP AAA Server (step 14), and the 3GPP AAA Server includes this back-off time in the EAP Failure message it sends to the UE (steps 15 & 16).

Upon reception of that back-off time, the UE shall not initiate any new PDN connection requests for the congested APN (be it via 3GPP or non-3GPP access) for the duration of this back-off time. The UE may initiate new requests for other APNs.

Note 1: sending an EAP Failure to a UE without a back-off time does not suffice to prevent the UE from trying to access again the overloaded APN. As per WFA Hotspot 2.0 Specification, Release 2.0 version 3.0.8, Section 6.4.4:

"A mobile device may fail to successfully complete EAP authentication to the hotspot using a particular credential. Failure may be due to a variety of reasons including invalid credentials, network problems, misconfigured APs, etc. However, authentication failure does not necessarily mean there is a problem with a credential or subscription, the credential may still be valid with other APs. Therefore, in the case of a EAP authentication failure the mobile device:

shall not attempt more than 10 consecutive EAP authentications that result in EAP authentication failures at same ESS using a given credential within a 10-minute interval. The authentication process may restart after the expiry of the 10-minute time interval.

should not disable this credential from being used with other BSSs."

The TWAN also communicates in step 14 the APN that is being rejected with the back-off time and an overload cause code. The 3GPP AAA Server may immediately reject any subsequent request targeting this APN (steps 1' to 8') from the same UE until the back-off timer is expired. In that case, the 3GPP AAA Server does not download the user's subscription information from the HSS and does not authorize the TWAN to proceed with the UE request, and return an EAP Failure message with a cause indicating that the requested APN is congested and with the remaining back-off time (step 10').

The TWAN may also indicate in step 14 whether the 3GPP AAA Server should back off all the requests from all other UEs targeting this APN. If so instructed by the TWAN, the 3GPP Server may also immediately reject any subsequent request targeting this APN from any other UEs (in SCM or TSCM).

Embodiments of such mechanism may also be described as follows.

The Single-Connection mode requires support of EAP extensions between the UE and the 3GPP AAA server to setup or handover a PDN connection. These EAP extensions could thus be leveraged to convey an "APN congestion" cause and an APN back-off timer from the 3GPP AAA Server to the UE to prevent the UE from unnecessarily retrying new session or handover requests to a PGW or APN that is overloaded, when no other alternative PGWs can serve the UE request, as depicted in FIG. 3.

This corresponds to the call flow specified in figure 16.2.1-1 of 3GPP TS 23.402 for the Single-Connection mode with the following additions:

At step 14, when rejecting a UE request (new PDN connection or handover request in trusted WLAN access) from an authenticated and authorized user (after step 11 or step 13)), the TWAN may signal an APN congestion cause and a back-off time to the 3GPP AAA Server for the UE and the requested APN when congestion control is active for the APN (e.g. PGW has triggered overload control towards the TWAN for traffic targeting this APN).

2. At step 15, the 3GPP AAA Server includes an APN congestion cause and the back-off time (received from the TWAN) in the EAP Failure message it sends to the UE.

3. At step 16, upon reception of this cause and back-off time, the UE shall not initiate any new session or handover request for the congested APN (be it via 3GPP or non-3GPP access) for the duration of the back-off time. The UE may initiate new requests for NSWO or both APNs.

2) The TWAN Implements a Back-Off Mechanism on Behalf of UEs, for UEs in TSCM, as Follows:

Embodiments for such mechanism are illustrated in FIG. 4 (TSCM UE repeating an access to an overloaded APN)

The UE first attempts to attach/establish or moves a PDN connection via the trusted WLAN access. A full authentication and authorization procedure takes place, involving multiple signaling exchanges between the UE, TWAN, 3GPP AAA Server (and 3GPP AAA Proxy in roaming scenarios) and HSS (steps 2 to 11). Once the UE is authenticated and authorized, the TWAN selects the PGW and attempts to establish the PDN connection towards the PGW, e.g. by sending a GTP-C Create Session Request (with the UE's identity, requested APN, . . . ).

In this example, the PGW rejects the PDN connection establishment request due to an overload of the APN (e.g. no more IP@ available for that APN) or an overload of the PGW. The PGW may provide overload information in its response to the TWAN, requesting the TWAN to throttle a certain percentage of the traffic the TWAN sends towards that PGW and for a certain duration (as per the principles documented in TR 29.807).

It is also possible that the TWAN does not initiate the PDN connection establishment request over S2a as it had beforehand received an indication of a PGW or APN congestion and decides immediately that the UE connection request is to be ejected.

To reject the connection request from the UE, the TWAN may (step 14):

a) per 3GPP Rel-11 TSCM call flow and procedures, tear down the WLAN resources and trigger the release of the Diameter session established over STa (i.e. between the TWAN and the 3GPP AAA Server) by sending a Session Termination Request message;

b) or alternatively send an AAA request indicating the overload condition and asking the 3GPP AAA Server to generate a relevant EAP-Failure message to the UE.

Since a UE in TCSM is unaware of the reason of the WLAN resources release, the UE in TSCM may repeat the whole procedure again, starting from a new authentication and authorization procedure (step 18 and following).

Note 2: it is not possible to change TSCM UE implementations—no changes are allowed for this behaviour specified in 3GPP Rel-11.

Note 3: it may also be interesting for the network to protect itself against mis-behaving SCM UE (SCM UE that do not follow the back-off timer specified in the mechanism 1) or if the new back-off mechanism is specified as optional for a UE to support in 3GPP standards.

Without such mechanism, the full scenario (as depicted for A. "UE attaches/requests to establish a PDN connection", i.e. steps 1. to 16 of FIG. 4)) would occur again, and this, as many times as UEs would repeat its attempt. This would induce useless signaling between the TWAN, the 3GPP AAA Server and the HSS.

With such mechanism, when it rejects a UE request (one PDN connection or handover request in trusted WLAN access) from an authenticated and authorized user, (which may happen after step 11 or step 13 depending on whether the TWAN already knows whether the requested APN or PGW is overloaded or not), the TWAN may store a back-off time per UE and SSID when congestion control is active for an APN (e.g. PGW has triggered overload control towards the TWAN for traffic targeting this APN) (step 17).

The TWAN may immediately reject (or silently discard) any subsequent request from the UE targeting this APN, i.e. any subsequent EAP signalling originated from the same UE's MAC address over the same selected WLAN SSID (at step 18), before the back-off timer is expired. The TWAN does not generate any AAA signalling towards the 3GPP AAA Server in that case. The TWAN may reject the UE request by sending back an EAP Failure message (e.g. with the code 4 as per IETF RFC 3748) (step 21) and/or by releasing the WLAN association (step 22).

Note 4: the UE's MAC address is used in the SaMOG connection model for associating in the TWAN the UE-TWAG point-to-point link and S2a tunnel.

Note 5: Steps 18 and 19 in FIG. 4 are terminated at the AP within the TWAN, i.e. step 20 is the first message seen by the TWAP.

In one possible embodiment, the TWAG (i.e. TWLAN Access Gateway that terminates S2a towards the PGW, see TS 23.402 clause 16.1.2) provides the TWAP (i.e. TWLAN AAA Proxy, i.e. function in the TWAN which terminates STa towards the 3GPP AAA Server, see TS 23.402 clause 16.1.2) with an overload error cause and a back-off time when rejecting the UE request after step 11 or 13. The TWAP creates and maintains then a new UE-OC (UE Overload Control) record for the duration of the back-off time.

(For a UE in TSCM) The UE-OC record should contain the UE's MAC address, the SSID, the UE's IMSI and the back-off time (or the absolute timestamp until which subsequent requests need to be throttle—which is equivalent). Since there is a one to one mapping between an SSID and an APN for TSCM for a given UE, it is not necessary to store the APN in the record (or a wildcard APN may be stored), i.e. storing the SSID in the UE-OC record (instead of the APN) allows to throttle subsequent EAP signaling from the UE using the same selected SSID (w/o having to download the subscription information again from the 3GPP AAA Server).

Note 6: this mechanism can also be used in the TWAN to reject UE retries from a UE in SCM mode (misbehaving/cheating UE or if the new APN back off mechanism for SCM is optional for a UE to support). In that case, the UE-OC record should contain the UE's IMSI, the APN and the back-off time (this UE may legally request a connection to another, possibly not congested, APN). The UE-OC record may also be used to deal with TWAG congestion, in which case the APN may be given a wild card value.

Storing the MASI in the context allows to prevent an hacked UE from using multiple MAC addresses with the same IMSI (that could result in a memory DoS attacks with many UE-OC records to store in the TWAN).

Upon receipt of new subsequent EAP signaling from a UE, the TWAP checks whether it needs to back-off the UE by checking whether it has a UE-OC context for the same UE's MAC address and SSID. If that is the case, the TWAP rejects the UE request as described above (step 21) instead of triggering an authentication and authorization procedure towards the 3GPP AAA Server.

Note 7: if this mechanism is used for UES in SCM, the TWAP checks whether it has a UE-OC context for the same IMSI and APN at step 11.

The TWAN should compute the back off time based on the load/overload info received from the PGW (or/and locally provisioned value). The PGW does not send a back-off time, but a validity period for the overload metric, that may also be used for computing the value of the back-off time.

Embodiments of such mechanism may also be described as follows.

For UEs in Transparent Single-Connection mode (for which no extensions are being nor can be defined between the network and the UE), the TWAN may support a back-off mechanism on behalf of the UE as depicted in FIG. 4.

This corresponds to the call flow specified in figure 16.2.1-1 of 3GPP TS 23.402 for the Transparent Single-Connection mode with the following additions:

1. At step 17, when rejecting a UE request (new PDN connection request in trusted WLAN access) from an authenticated and authorized user (after step 11 or step 13), the TWAN may start a back-off timer per UE and SSID when congestion control is active for the APN (e.g. PGW has triggered overload control towards the TWAN for traffic targeting this APN).

NOTE 3: On a given SSID, a UE in Transparent Single-Connection mode can only access one pre-defined APN for EPC access, thus if an UE attempt has been rejected on this SSID due to congestion, any further UE connectivity attempt may be rejected during the back-off time. The UE may nevertheless be allowed to access on another SSID where the UE may be granted access to NSWO.

NOTE 4: In this example, the PGW rejects the PDN connection establishment request due to an overload of the APN or an overload of the PGW. The PGW may provide overload information in its response to the TWAN, requesting the TWAN to throttle a certain percentage of the traffic the TWAN sends towards that PGW. But it is also possible that the TWAN does not initiate the PDN connection establishment request over S2a if it has beforehand received an indication of a PGW or APN overload and decides immediately that the UE connection request is to be rejected.

2. At step 21, the TWAN may immediately reject (or silently discard) any subsequent request from the UE targeting this APN, i.e. any subsequent EAP signalling originated from the same UE's MAC address over the same selected SSID, received before the back-off timer is expired. In that case, the TWAN does not generate any AAA signalling towards the 3GPP AAA Server. The TWAN may reject the UE request by sending back an EAP Failure message (e.g. with the code 4 as per IETF RFC 3748 [x]) and/or by releasing the WLAN association (step 21' and step 22).

NOTE 5: The UE's MAC address is used in the SaMOG connection model for associating in the TWAN the UE-TWAG point-to-point link and S2a tunnel.

NOTE 6: If the TWAN does not immediately reject the UE request at step 21, the full sequence (steps 1 to 16) takes place again, and this as many times as the UE will repeat its request during the overload situation.

As an example of possible implementation, the TWAG (i.e. TWLAN Access Gateway that terminates S2a towards the PGW, see TS 23.402 clause 16.1.2) provides the TWAP (i.e. TWLAN AAA Proxy, i.e. function in the TWAN which terminates STa towards the 3GPP AAA Server, see TS 23.402 clause 16.1.2) with an overload error cause and a back-off time when rejecting the UE request after step 11 or step 13. The TWAP creates and maintains then a new UE-OC (UE Overload Control) record for the duration of the back-off time. The UE-OC record contains the UE's MAC address, the UE's IMSI and the back-off time (or the absolute timestamp until which subsequent requests should be rejected). Storing the IMSI in the context allows to prevent an hacked UE from using multiple MAC addresses with the same IMSI (that could result in a memory DoS attacks with many UE-OC records to store in the TWAN).

Benefits of embodiments of the present invention include protecting the TWAN, 3GPP AAA Server (and 3GPP AAA Proxy in roaming scenarios) and HSS from large signalling overhead that would result from rejecting a UE request to establish or move a PDN connection via trusted WLAN access e.g. during an APN congestion or a PGW overload. It also enables the deployment of GTP-C overload control on the S2a interface without increasing authentication and authorization signalling in the network.

In one aspect, there is provided a Trusted WLAN Access Network TWAN, for trusted WLAN access to EPC, configured to:

when, for an authenticated and authorized user, ejecting, due to congestion, a request for an UE in single connection mode (SCM) signal to a AAA Server a congestion cause and a back-off time for an UE.

Various embodiments are provided, which may be used alone or in combination.

In an embodiment, the TWAN is configured to:

when, for an authenticated and authorized user, rejecting, as congestion control is active for an APN, a request for an UE in single connection mode (SCM), signal to a AAA Server a congestion cause and a back-off time for the UE and the requested APN.

In an embodiment, the TWAN is configured to:
receive overload control information from PDN Gateway PGW having triggered overload control towards the TWAN for traffic targeting a requested APN or for any traffic.

In an embodiment, the TWAN is configured to:
indicate to the AAA Server whether the AAA Server should back-off requests from other UEs targeting the same APN.

In another aspect, there is provided a AAA Server, configured to, for trusted WLAN access to EPC:
receive from a Trusted WLAN Access Network TWAN a congestion cause and a back-off time for a request for an UE in single connection mode,
include a congestion cause and the back-off time in a response message it sends to the UE
optionally reject any subsequent request from the same UE until the back-off timer expires, by returning a response message with a congestion cause and with the remaining back-off time.

In an embodiment, the AAA Server may be configured to:
reject any subsequent request from other UEs targeting the APN until the back-off timer expires, if the AAA Server has received from the TWAN an indication that the AAA Server should back-off requests from other UEs targeting the same APN.

In another aspect, there is provided a AAA Server, configured to, for trusted WLAN access to EPC:
receive from a Trusted WLAN Access Network TWAN an APN congestion cause and a back-off time for a requested APN for a request for an UE in single connection mode,
include an APN congestion cause and the back-off time in a response message it sends to the UE
optionally reject any subsequent request from the same UE targeting the same APN until the back-off timer expires, by returning a response message with a congestion cause and with the remaining back-off time.

In an embodiment, the AAA Server may be configured to:
reject any subsequent request from other UEs targeting the APN until the back-off timer expires, if the AAA Server has received from the TWAN an indication that the AAA Server should back-off requests from other UEs targeting the same APN.

In another aspect, there is provided an User Equipment UE, configured to, at trusted WLAN access to EPC:
upon reception from a AAA Server, of a congestion cause and back-off time, not initiate any new request for the duration of the back-off time.

Various embodiments are provided, which may be used alone or in combination.

In an embodiment, the User Equipment UE is configured to, at trusted WLAN access to EPC:
upon receipt on from a AAA Server, of an APN congestion cause and back-off time, not initiate any new request for the congested APN for the duration of the back-off time.

In an embodiment, the User Equipment UE is configured to:
receive the congestion cause and back-off time in a response message from the AAA Server.

In another aspect, there is provided a Trusted WLAN Access Network TWAN, for trusted WLAN access to EPC, configured to:
when rejecting, due to congestion, a request for an UE in SCM mode for an authenticated and authorized user, start a back-off timer for the UE, or for the UE and the requested APN when congestion control is active for the requested APN;
reject any subsequent request from the same UE or any subsequent request from the same UE targeting the APN until the back-off timer expires, by returning a response message to the AAA Server with a congestion cause and with the remaining back-off time.

In another aspect, there is provided a Trusted WLAN Access Network TWAN, for trusted WLAN access to EPC, configured to:
when, due to congestion, rejecting a request for an UE in TSCM mode for an authenticated and authorized user, start a back-off timer per UE when congestion control is global or start a back-off timer per UE and per SSID when congestion control is active for the requested APN.

Various embodiments are provided, which may be used alone or in combination.

In an embodiment, the TWAN is configured to:
reject or silently discard any subsequent request from the same UE or any subsequent request from the same UE targeting the same SSID, received before the back-off timer is expired.

In an embodiment, the TWAN is configured to:
detect that the request comes from the same UE based on the MAC address of this UE in order to reject or silently discard any subsequent signalling request originated from the same UE or any subsequent signalling request originated from the same UE over the same selected SSID, received before the back-off timer is expired.

In an embodiment, the TWAN is configured to:
reject any subsequent request from the UE or any subsequent request from the UE over the same selected SSID by sending back a response message and/or by releasing the WLAN association.

In an embodiment, the TWAN is configured to:
create and maintain an UE Overload Control record for the duration of the back-off time, containing for an UE in Transparent Single Connection Mode, the UE's MAC address, the SSID, the UE's IMSI and the back-off time.

In an embodiment, the TWAN is configured to:
upon receipt of new subsequent signalling request from the UE, check whether the TWAN needs to back off the UE, by checking whether it has an UE Overload Control record for the same UE's MAC address and possibly SSID.

In an embodiment, the TWAN is configured to:
receive overload information from PDN Gateway PGW having triggered overload control towards the TWAN for traffic targeting the APN or for any traffic.

In another aspect, there is provided a method for overload control for Trusted WLAN access to EPC, comprising:
when rejecting, due to congestion, a request for an UE in SCM mode for an authenticated and authorized user, the network signalling a back-off time to the UE, possibly only applicable to the requested APN when congestion control is active for the APN,
upon reception of the back-off time, the UE not initiating new request or new request for the congested APN, for the duration of the back-off time.

In another aspect, there is provided a method for overload control for Trusted WLAN access to EPC, comprising:
when rejecting, due to congestion, a request for an UE in TSCM mode for an authenticated and authorized user, the Trusted WAN Access Network TWAN starting a back-off timer per UE when congestion control is global or starting a back-off timer per UE and SSID when congestion control is active for the requested APN.

In an embodiment, the method comprises:

the Trusted WAN Access Network TWAN rejecting or silently discarding any subsequent request from the same UE, or from the same UE targeting the APN, received before the back-off timer is expired.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
   at least, one memory configured to store computer-readable instructions; and
   at least one processor configured to execute the computer-readable instructions to cause the apparatus to
      request establishment of a packet data network connection via a trusted wireless local area network access to an evolved packet core network, in a single connection mode wherein a single connection at a time is supported via the trusted wireless local area access network,
      receive, from an authentication, authorization, and accounting server, a response message including a failure cause due to congestion and a back-off time, and
      not initiate a new request for said establishment of a packet data network connection, for a duration of the back-off time.

2. The apparatus according to claim 1, wherein the request is for a requested access point name, and the back-off time is for the requested access point name.

3. A method comprising:
   requesting establishment of a packet data network connection via a trusted wireless local area network access to an evolved packet core network, in a single connection mode wherein a single connection at a time is supported via the trusted wireless local area network access network;
   receiving, from an authentication, authorization, and accounting server, a response message including a failure cause due to congestion and a back-off time; and
   not initiating a new request for said establishment of a packet data network connection, for a duration of the back-off time.

4. The method according to claim 3, wherein the request is for a requested access point name, and the back-off time is for the requested access point name.

5. An apparatus comprising:
   at least one memory configured to store computer-readable instructions; and
   at least one processor configured to execute the computer-readable instructions to cause the apparatus to
      receive overload information from a packet data network gateway of an evolved packet core network for a user equipment request for access to said evolved packet core network via a trusted wireless local area network access network, for a connection to a packet data network, in a single connection mode wherein a single connection at a time is supported via the trusted wireless local area access network, and
      reject said request and signal to an authentication, authorization, and accounting server a failure cause due to congestion and a back-off time to signal to the user equipment to cause the user equipment not to initiate a new request for a duration of the back-off time.

6. The apparatus according to claim 5, wherein the request is for a requested access point name, and the back-off time is for the requested access point name.

* * * * *

UNITED STATES PATENT AND TRADEMARK OFFICE
CERTIFICATE OF CORRECTION

PATENT NO. : 10,645,611 B2
APPLICATION NO. : 15/105856
DATED : May 5, 2020
INVENTOR(S) : Bruno Landais et al.

Page 1 of 1

It is certified that error appears in the above-identified patent and that said Letters Patent is hereby corrected as shown below:

In the Claims

Column 13, Line 26 Claim 1, delete "at least," and insert --at least--.

Column 13, Line 38 Claim 1, delete "hack-off" and insert --back-off--.

Signed and Sealed this
Second Day of March, 2021

Drew Hirshfeld
*Performing the Functions and Duties of the
Under Secretary of Commerce for Intellectual Property and
Director of the United States Patent and Trademark Office*